United States Patent
Bradt

[15] 3,698,254
[45] Oct. 17, 1972

[54] POWER TRANSMISSION MECHANISM
[72] Inventor: Gordon E. Bradt, Wilmette, Ill.
[73] Assignee: Bell & Howell Company, Chicago, Ill.
[22] Filed: Sept. 2, 1969
[21] Appl. No.: 854,408

[52] U.S. Cl. ..................74/143, 74/112, 350/187
[51] Int. Cl. ...............................................F16h 27/02
[58] Field of Search..........74/112, 577, 143, 142, 27; 350/187; 192/55

[56] References Cited

UNITED STATES PATENTS

| | | | |
|---|---|---|---|
| 2,061,827 | 11/1936 | Brooks | 192/55 |
| 593,313 | 11/1897 | Schultz | 192/55 |
| 1,154,891 | 9/1915 | Sharpnack | 192/55 |
| 2,939,561 | 6/1960 | Rudisch | 192/55 |
| 2,757,569 | 8/1956 | Isom | 74/112 |
| 2,995,061 | 8/1961 | Briskin et al | 350/187 |
| 3,115,785 | 12/1963 | Simmons | 74/142 |
| 3,481,212 | 12/1969 | Delaney | 74/142 |

*Primary Examiner*—William F. O'Dea
*Assistant Examiner*—Wesley S. Ratliff, Jr.
*Attorney*—Finnegan, Henderson, Farabow & Garrett

[57] ABSTRACT

A power transmission mechanism having a reciprocating drive means for imparting rotation to a reversibly rotatable body is improved by having an output drive member connected to the rotatable body and resilient means connecting the rotatable body and the output drive member for transmitting the rotational motion of the rotatable body to the output drive member. The resilient means is deflectable so that it can deflect from its normal position to store a portion of the rotational energy while transmitting the remainder of the rotational energy in the form of rotational movement to the output drive member while the reversibly rotatable body is rotating. The resilient means then reverts to its normal position to release the stored energy and continue moving the output drive member after the reversibly rotatable body is stopped.

8 Claims, 8 Drawing Figures

FIG. 1

INVENTOR
GORDON E. BRADT

Finnegan, Henderson & Farabow
ATTORNEYS

INVENTOR
GORDON E. BRADT

Finnegan, Henderson & Farabow
ATTORNEYS

FIG. 7

POWER TRANSMISSION MECHANISM

This invention relates to a power transmission mechanism and more particularly to a mechanism for transmitting power from a rotating power source.

A great number of power transmission mechanisms which transmit power from a power source are known in the prior art and in recent years these mechanisms have been developed for use in a zoom lens system such as those found in motion picture and television cameras. In an application entitled, "Power Transmission Mechanism", filed by Henry J. Koeber, U.S. Ser. No. 854,474 and assigned to the same assignee as the present invention, such a power transmission mechanism is described. In that application, the power transmission mechanism includes a reversibly rotatable body for transmitting power from a rotating power source, reciprocating drive means mounted adjacent the outer periphery of the reversibly rotatable body and movable between an operative position and an inoperative position with respect to the reversibly rotatable body and operating means connected to the reciprocating drive means for imparting reciprocative motion to the reciprocating drive means to cause the reciprocating drive means to intermittently engage the rotatable body and rotate the rotatable body intermittently.

The reversibly rotatable body of that power transmission mechanism can be connected to a movable lens element or zoom lens of a zoom lens system by conventional means such as a key secured to a zoom ring and engaged within a helical groove located on the inner periphery of the reversibly rotatable body. In one embodiment the reversibly rotatable body has a plurality of ratchet teeth on its outer periphery and is driven in a reciprocating motion by a reciprocating drive means which engages the ratchet teeth on the reversibly rotatable body. The reversibly rotatable body therefore must rotate in an intermittent stepping motion which, although an improvement over the prior art devices, cannot provide a continuous, rotary motion which is often desirable in general, and is particularly desirable when the power transmission mechanism is to be used for powering a zoom lens system.

Accordingly, this invention advantageously provides a new and improved power transmission mechanism that smoothes out the intermittent step motion of prior power transmissions that utilize a reciprocating drive means. This invention also provides a new and improved power transmission mechanism that can be used in a zoom lens system to permit the obtaining of a smooth, uniform, continuous zooming action and a sharp image without blur due to the zooming action.

Additional advantages of the invention will be set forth in part in the description which follows, and in part will be obvious from the description, or may be learned by practice of this invention. The advantages are realized and attained by means of the instrumentalities and combinations particularly pointed out in the appended claims.

The power transmission mechanism with which this invention is used transmits power from a rotating power source having a continuous rotary motion to a reversibly rotatable body having intermitten rotary motion. The mechanism includes reciprocating drive means mounted adjacent the outer periphery of the body, and operating means connected to the drive means for imparting reciprocative motion to the drive means to cause the drive means to intermittently engage and rotate the body. The body has rotational energy during frictional driving engagement of the body by the drive means and the body is stopped during frictional driving disengagement of the reciprocating drive means.

The present invention as broadly described is the improvement comprising an output drive member connected to the reversibly rotatable body and resilient means connecting the body and the output drive member for transmitting the rotational motion of the body to the output drive member. The resilient means is deflectable from its normal position to permit the resilient means to store a portion of the rotational energy while transmitting the remainder of the rotational energy in the form of rotational movement to the output drive member while the body is rotating, and the resiliency of the resilient means being sufficient to revert the resilient means to its normal position to release the stored energy and continue moving the output drive member after the body is stopped.

Preferably, the output drive member includes an axial groove and the resilient means extends axially into the groove and is frictionally engaged within the groove to resilient couple the output drive member to the reversibly rotatable body. Additionally, it is preferred that the groove have two spaced parallel axially extending walls and the resilient means include two axially extending legs which frictionally engage the axial extending walls.

It is also desirable to provide a deflection limiter to limit the deflection of the resilient means and to provide a non-resilient coupling when the deflection is so limited. The deflection limiter preferably extends axially from the reversibly rotatable body and is positioned within the output drive member in an axial groove having axial sides with the deflection limiter being spaced from the axial sides. It is also preferred that the deflection limiter extend into the same groove as the resilient means, and that the deflection limiter extend between and be spaced from the legs of the resilient means. Alternatively, the output drive member may have a second groove with the deflection limiter being positioned within the second groove.

The power transmission mechanism can be used to power a zoom lens system having a movable lens element with the output drive member being a zoom ring connected to the movable lens element for moving the lens element axially when the zoom ring is rotated.

The invention consists in the novel parts, constructions, arrangements, combinations, and improvements shown and described. The accompanying drawings, which are incorporated in and constitute a part of this specification, illustrate one embodiment of the invention and, together with the description, serve to explain the principles of the invention.

It is to be understood that both the foregoing general description and the following detailed description are exemplary and explanatory but are not restrictive of the invention.

Figure 1:
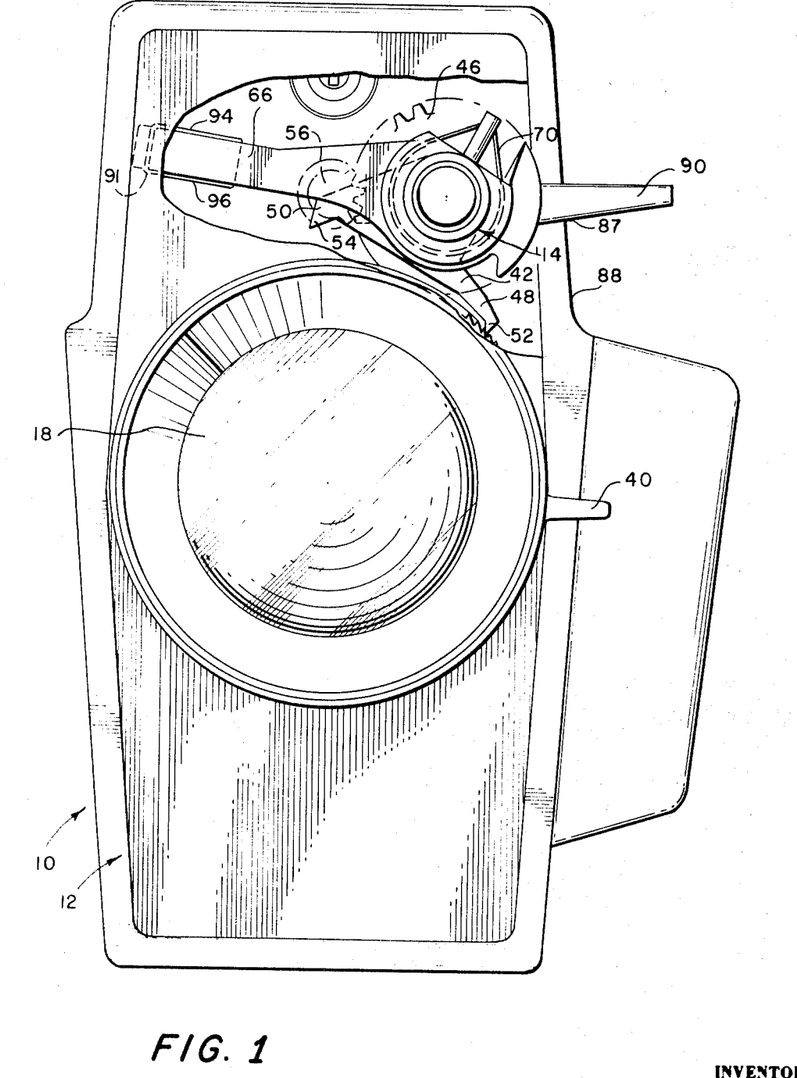
FIG. 1 is a front elevation partially in section of a camera having a power transmission mechanism constructed in accordance with the teachings of this invention.
Figures 2, 8:
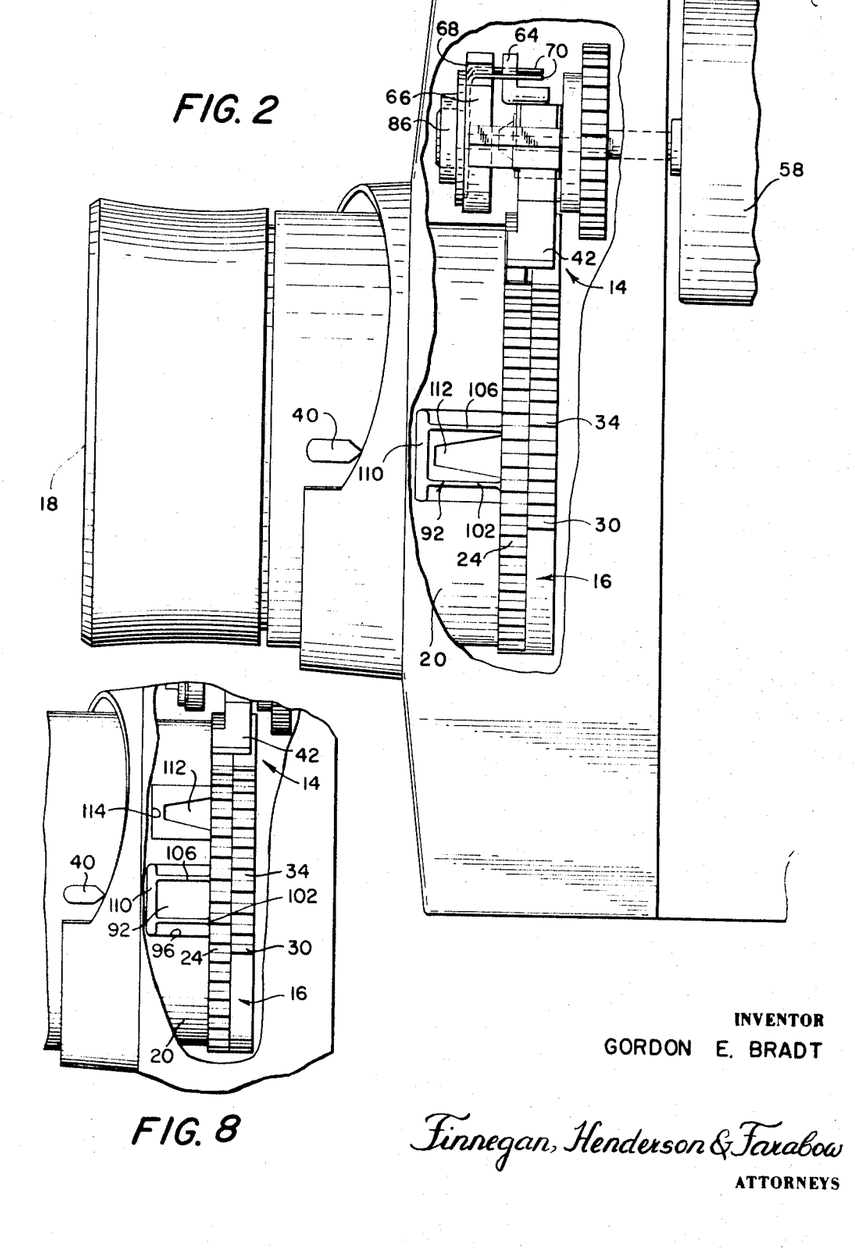
FIG. 2 is a side elevation partially in section of the camera of FIG. 1 with parts omitted for clarity.
FIG. 8 is a partial side elevation view partially in section showing a resilient mean and a deflection limiter mounted in separate axial grooves on the output drive member.

With reference particularly to FIGS. 1 and 2, the invention is here embodied in a camera, designated generally by numeral 10, comprising a housing, generally 12, on which is mounted a power transmission mechanism, generally indicated by numeral 14. The power transmission mechanism is driven by a rotating power source having a continuous rotary motion, such as camera drive motor 58. The power transmission mechanism powers a zoom lens system which can be coupled to the viewfinder assembly of the camera by conventional means (not shown) so that the camera operator will always observe in the viewfinder exactly the same scene which is being photographed at any given point throughout the entire range of adjustment of the zoom lens system.

Figure 5:
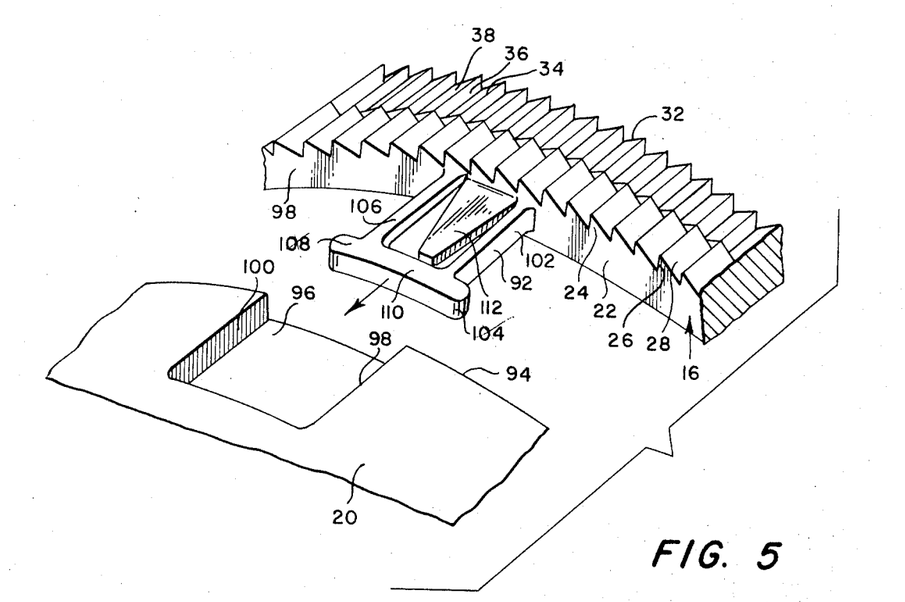
FIG. 5 is an enlarged view of the reversibly rotatable body and the output drive member illustrating the cooperation of the resilient means, the deflection limiter, and the groove in the output drive member.
Figure 6:
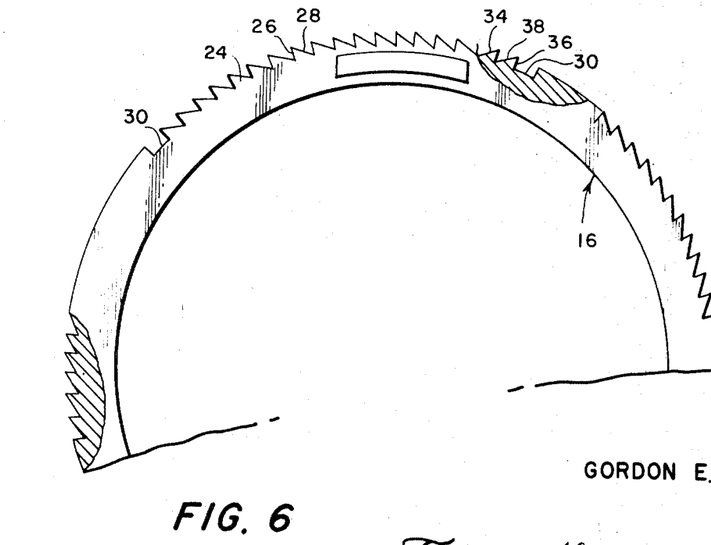
FIG. 6 is an enlarged view of a row of ratchet teeth on the reciprocating drive means and illustrating a skip tooth at the end of the row of ratchet teeth.

The power transmission mechanism transmits power from the rotating power source to a reversibly rotatable body having intermittent rotary motion. As here embodied, the reversibly rotatable body is a rotatable wheel, generally 16, connected to a movable lens element 18 by a zoom ring 20 for moving the lens element axially when the zoom ring is rotated. As illustrated in FIGS. 5 and 6, rotatable wheel 16 has a front cylindrical portion 22 which has a row of identical buttress-shaped teeth 24, each tooth having a substantially radially extending face 26 and an inclined face 28 which extends in a clockwise direction (as viewed from the front of the camera from the top of the tooth to the body of the rotatable wheel. At the left end of the row of teeth 24 a skip tooth 30 is provided.

Rotatable wheel 16 also contains a rear cylindrical portion 32 having a row of identical buttress-shaped teeth 34, each tooth having a substantially radially extending face 36 and an inclined face 38 which extends from the top of the tooth in a counterclockwise direction to the body of the rotatable wheel. Buttress teeth 34 thus face in a direction opposite to the direction of buttress teeth 24. At the right end of the row of teeth 34 a gap or skip tooth 30 is provided.

Figure 3:
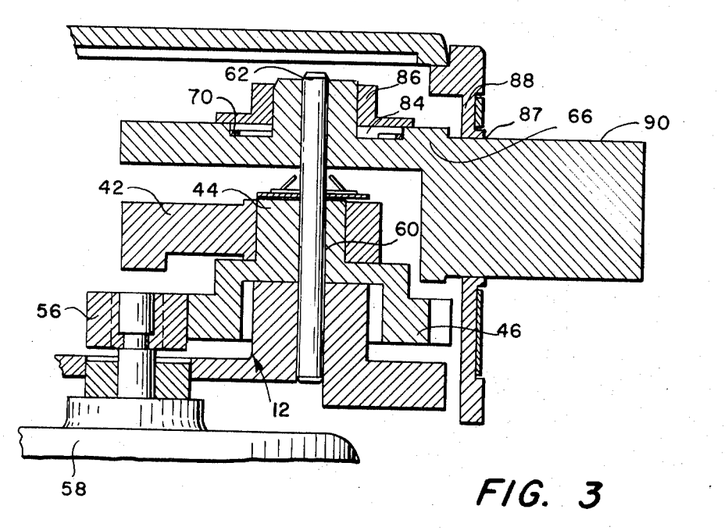
FIG. 3 is a sectional view showing the mounting of an actuator lever for moving the reciprocating drive means and the mounting of the reciprocating drive means on the operating means.
Figure 4:
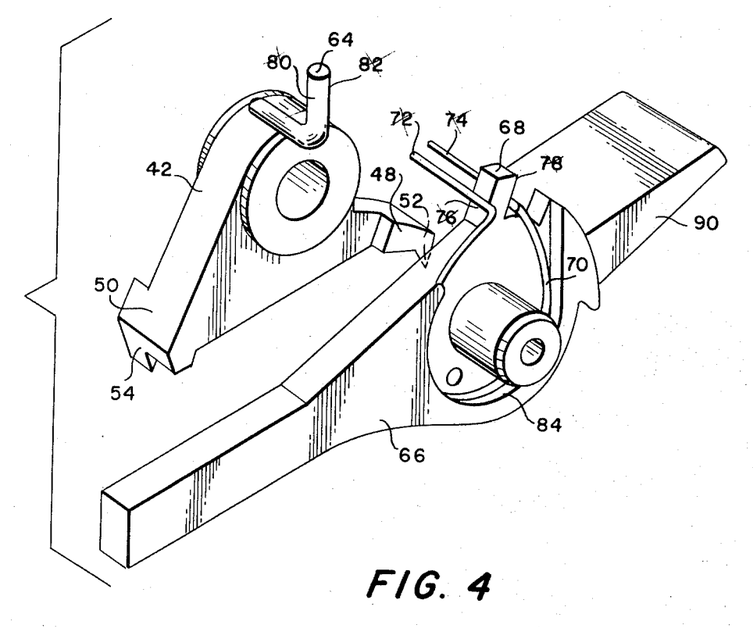
FIG. 4 is an enlarged exploded view of the reciprocating drive means and actuator lever.

A reciprocating drive means is mounted adjacent the outer periphery of the reversibly rotatable body and is movable between an operative position and an inoperative position with respect to the reversibly rotatable body. As here embodied, and as illustrated in FIGS. 3 and 4, the reciprocating drive means is a ratchet pawl 42 which is slidably mounted on an eccentric hub 44 of an eccentric drive gear 46 (FIG. 3) and contains a first radially outwardly extending pawl arm 48 that can be engaged with buttress teeth 24 on front cylindrical portion 22 and a second radially extending pawl arm 50 that can be engaged with buttress teeth 34 on rear cylindrical portion 32 (FIG. 4). Pawl arms 48 and 50, respectively, have extensions 52 and 54 so that paw' arm 48 can only engage buttress teeth 24 and pawl arm 50 can only engage buttress teeth 34.

Operating means are connected to the reciprocating drive means for imparting reciprocative motion to the reciprocating drive means to cause the reciprocating drive means to intermittently engage and rotate the reversibly rotatable body. As here embodied, and as shown in FIG. 3, the operating means include an eccentric drive gear 46 having an eccentric bearing hub 44 which imparts a reciprocative motion to ratchet pawl 42 which is slidably mounted on eccentric hub 44. Ratchet pawl 42 thereby intermittently engages rotatable wheel 16 and rotates the wheel intermittently. The rotatable wheel is rotated and has rotational energy during frictional driving engagement of the wheel by the ratchet pawl 42 and the wheel is stopped during frictional driving disengagement of ratchet pawl 42. Gear 46 is driven by pinion gear 56 which is rotatably driven by the rotating power source such as camera drive motor 58. A bore 60 passes axially through gear 46 to enable gear 46 to be mounted on and rotate about a shaft 62 mounted on housing 12.

Actuating means are connected to the reciprocating drive means for moving the reciprocating drive means between the operative position and the inoperative position, and, as here embodied, include an alignment arm 64 extending radially outwardly from ratchet pawl 42, an actuator lever 66 having an actuator arm 68 in alignment with the alignment arm and resilient means, such as a tension spring 70, for holding actuator arm 68 and alignment arm 64 in alignment. Spring 70 has two legs 72 and 74 positioned on opposed sides 76 and 78 of actuator arm 68 and the correspondingly opposed sides 80 and 82 of alignment arm 64. Spring 70 is positioned on actuator lever 66 which is mounted on shaft 62 forwardly of gear 46. Actuator lever 66 is rotatably mounted on shaft 62 and spring 70 is positioned within a recess 84 on actuator lever 66. A hub 86 is positioned about actuator lever 66 and traps spring 70 within recess 84. Actuator lever 66 extends radially outwardly from shaft 62 and passes through an opening 87 in a side 88 of housing 12. (FIGS. 1 and 3).

Actuator lever 66 is prevented from moving up and down on shaft 62 by the tight fit of the actuator lever within opening 87 in side 88 of housing 12. Actuator lever 66, spring 70, and hub 86 are pivotable about shaft 62. A knob 90 is mounted on actuator lever 66 for depressing or raising the lever. A second spring 91 is mounted on camera housing 12 and has a pair of legs 94 and 96 positioned on opposite sides of actuator lever 66 to hold the lever in a centered or inoperative position. In this position, the pawl arms of ratchet pawl 42 cannot engage buttress teeth 24 and 34 even if the camera drive motor is in operation.

In accordance with the invention, an output drive member is connected to the reversibly rotatable body and resilient means are provided for connecting the body and the output drive member for transmitting the rotational motion of the body to the output drive member, the resilient means being deflectable from its normal position to permit the resilient means to store a portion of the rotational energy while transmitting the remainder of the rotational energy in the form of rotational movement to the output drive member while the body is rotating, and the resiliency of the resilient means being sufficient to revert the resilient means to its normal position to release the stored energy and continue moving the output drive member after the body is stopped.

As here embodied, the output drive member is the zoom ring 20 which is connected to movable lens element 18 for transmitting movement to the movable lens element and the resilient means, generally 92, connects rotatable wheel 16 and zoom ring 20 for transmitting the rotational motion of the rotatable wheel to the zoom ring. Zoom ring 20 has a planar surface 94 positioned adjacent rotatable wheel 16, and, as shown in FIG. 5, is provided with an axial groove 96 in the planar surface, the groove having two spaced parallel axially extending walls 98 and 100. Resilient means 92 is mounted on a planar surface 98 of rotatable wheel 16, and extends axially into groove 96 and is frictionally engaged within axial groove 96 to resiliently couple the zoom ring to the rotatable wheel. Resilient means 92 comprises a first axially extending spring leg 102 which has a flange 104 frictionally engaged with axially extending wall 98 and a second axially extending spring leg 106 which has a flange 108 frictionally engaged with axially extending wall 100. The legs 102 and 106 are joined to each other by a transverse web 110. The resilient means keeps zoom ring 20 continually moving during power transmission and zoom action even while rotatable wheel 16 is stopped, since it is deflectable from its normal position, shown in FIG. 5, to store a portion of the rotational energy while transmitting the remainder of the rotational energy in the form of rotational movement to zoom ring 20 while the rotatable wheel is rotating, and the resiliency of the resilient means is sufficient to revert the resilient means to its normal position to release the stored energy and continue moving the zoom ring after the rotatable wheel is stopped.

Zoom ring 20 has a manually operable control lever 40 which extends radially outwardly from zoom ring 20 and passes through an opening in housing 12 so that the control lever can be manually engaged to rotate zoom ring 20 in either a clockwise or counterclockwise direction. (FIGS. 1 and 2).

In one embodiment of this invention, a deflection limiter is provided to limit the deflection of the resilient means and to provide a non-resilient coupling when the deflection is so limited. As here embodied, this means comprises a deflection limiter 112 which extends axially from rotatable wheel 16 and is positioned within zoom ring 20 in an axial groove having axial sides with the deflection limiter being spaced from the axial sides. As shown in FIG. 5, deflection limiter 112 extends into the same groove as the resilient means, that is, groove 96, and the deflection limiter extends between and is spaced from spring legs 102 and 106 of the resilient means.

In an alternative embodiment of the position of the deflection limiter to limit the deflection of the resilient means, and as shown in FIG. 8, the deflection limiter 112 can be positioned within a second axially extending groove 114 located on planar surface 94 of zoom ring 20.

In operation, when it is desired to transmit power and obtain a forward or telescopic adjustment of the zoom lens, knob 90 is depressed while the camera motor is running. When knob 90 is depressed actuator lever 66 and, therefore, actuator arm 68 are rotated in a clockwise direction. The movement of actuator arm 68 in a clockwise direction flexes spring 70 so that spring leg 72 acts on side 76 of alignment arm 64 to rotate ratchet pawl 42 in a clockwise direction and thereby press pawl arm 48 into contact with buttress teeth 24 on rotatable wheel 16. Because ratchet pawl 42 is being eccentrically driven by eccentric drive gear 46, pawl arm 48 will move back and forth with a reciprocating motion to engage and disengage buttress teeth 24 and, therefore, drive rotatable wheel 16 in a clockwise direction with a pulsing motion. Rotatable wheel 16 has a relatively high rotational friction and will rotate with a stop-start movement during the operation of the power zoom. Rotatable wheel 16 will rotate during a drive stroke when pawl arm 48 is engaged with buttress teeth 24 and will stop rotating during a return or disengagement stroke when pawl arm 48 is disengaged from buttress teeth 24. Rotation of rotatable wheel 16 causes spring leg 102 to rotate and results in the rotation of zoom ring 20 since spring leg 102 transmits rotational energy to zoom ring 20. However, spring leg 102 does not transmit all of its rotational energy while rotatable wheel 16 is rotating, but is deflected and stores a portion of it while rotatable wheel 16 is rotating and during the engagement of pawl arm 48 with buttress teeth 24. During the disengagement of pawl arm 48 from rotatable wheel 16, spring leg 102 due to its resilient nature returns to its original position and thus continues to move zoom ring 20 even though rotatable wheel 16 is stationary. This achieves a rate of zoom which averages between the intermittent movements of the rotatable wheel, and smoothes the movement of the movable lens so that one sees a smoother lens movement in the viewfinder.

Figure 7:
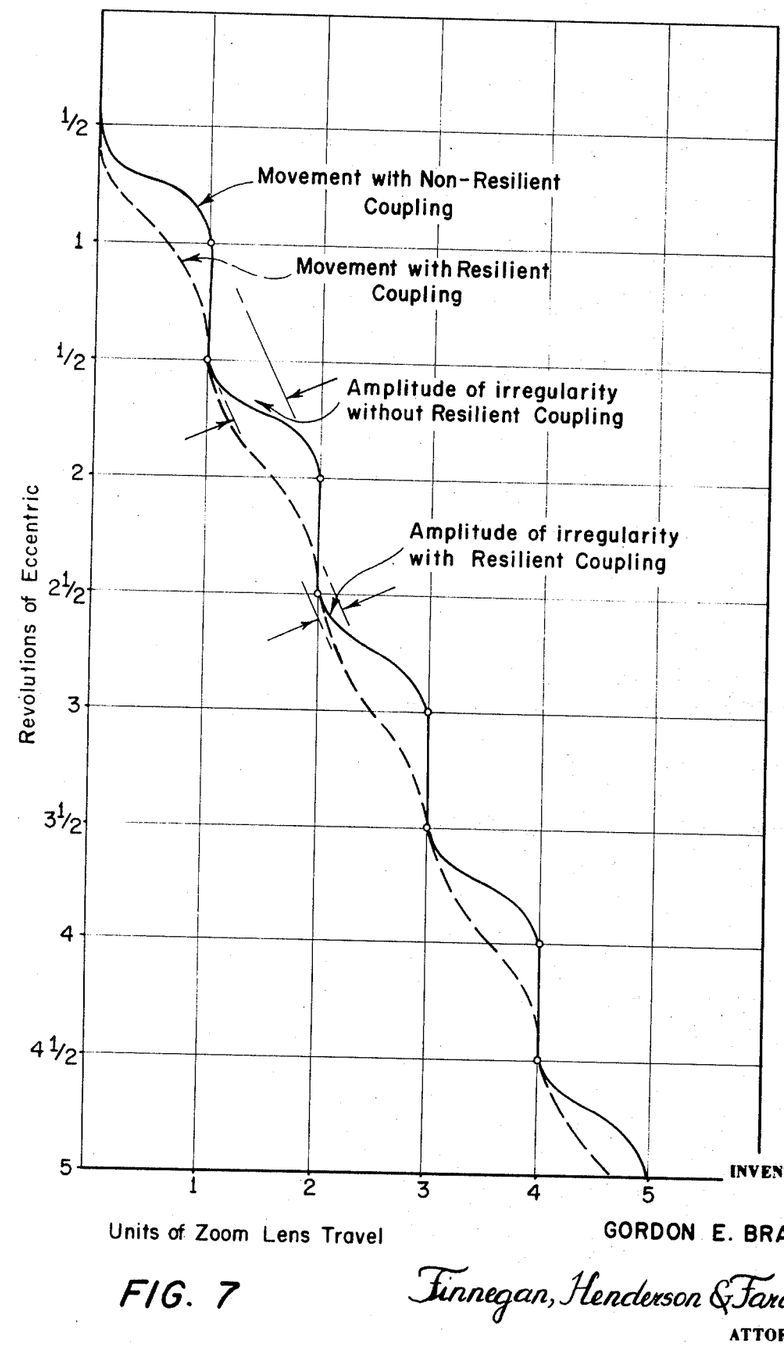
FIG. 7 is a graph illustrating the relationship between the revolutions of an eccentric which is an element of the operating means and the zoom lens travel with and without the resilient coupling.

This smoothing effect is graphically illustrated in FIG. 7 where revolutions of eccentric drive gear 46 are plotted against units of zoom lens travel. The solid line indicates zoom lens travel achieved without the resilient coupling of this invention and the broken line indicates zoom lens travel with the resilient coupling of this invention. It is apparent that without the resilient coupling the motion of the zoom lens approximates the motion given to the rotatable wheel by the eccentric drive gear 46; that is, there is no zoom lens motion for the one-half revolution where gear 46 is not causing the reciprocating drive means to engage and rotate the rotatable wheel and there is a zoom lens motion in the form of one-half of a sine function when eccentric drive gear 46 causes the reciprocating drive means to engage and rotate the rotatable wheel. The zoom lens thus has an irregular motion with the amplitude of the irregular motion being graphically shown in FIG. 7.

When a resilient coupling is added to the zoom mechanism to connect the rotatable wheel to the zoom ring, the motion of the zoom lens during power zoom action is continuous and although still irregular, the amplitude of the irregular motion is substantially less than the amplitude resulting without the resilient coupling. The zoom lens thus moves with a rate of movement which averages between the stop-start movement of the rotatable wheel and thus imparts a smoother, steadier movement of zoom lens element 18.

The clockwise rotation of the rotatable wheel will continue until actuator lever 66 is released which causes spring 91 to return actuator lever 66 to the center or inoperative position and stop the zoom action, or until pawl arm 48 runs out of engagement with the row of teeth 24 and into skip tooth 30.

When it is desired to transmit power to obtain a reverse or wide angle adjustment of the zoom lens system, knob 90 is raised while the camera motor is running. When knob 90 is raised, actuator lever 66, and therefore actuator arm 68, are moved in a counterclockwise direction (when viewed from the front of the camera). The movement of actuator arm 68 in a counterclockwise direction flexes spring 70 so that spring leg 74 acts on side 82 of alignment arm 64 to rotate ratchet pawl 42 in a counterclockwise direction and thereby press pawl arm 50 into contact with buttress teeth 34 on rotatable wheel 16. The eccentric drive of ratchet pawl 22 will now move pawl arm 50 with a reciprocating motion on buttress teeth 34, thus driving rotatable wheel 16 in a counterclockwise direction with a pulsing motion. The rotation of rotatable wheel 16 results in the rotation of zoom ring 20 since spring leg 106 transmits rotational energy to zoom ring 20. Spring leg 106 acts in a manner similar to the action of spring leg 102 described above in that the spring leg is deflected and transmits a portion of the rotational energy imparted to it by rotatable wheel 16 during the rotational movement of rotatable wheel 16 and stores the remainder of the rotational energy. When rotatable wheel 16 is stopped, spring leg 106 releases its stored energy by returning to its normal position and continues the movement of zoom ring 20 even though rotatable wheel 16 is stopped. Therefore, the intermittent motion of zoom lens element 18 exhibited in prior art mechanisms having a reciprocating drive means is transformed into a smoother continuous motion. The zoom action, skip tooth, and actuator lever then operate in a manner similar to that described above with respect to the forward movement.

When actuator lever 66 is in an inoperative position, control lever 40 can be arcuately moved in either a clockwise or counterclockwise direction to thereby move zoom ring 20 in a corresponding clockwise or counterclockwise direction. This movement of zoom ring 20 will result in a corresponding forward or reverse movement of movable lens element 18. Thus, zoom action is always achievable whether the camera motor is running or is inoperative. When control lever 40 is moved, zoom ring 20 drives rotatable wheel 16. However, when manual control lever 40 is engaged to move zoom ring 20, there is a possibility that the movement of zoom ring 20 will cause an overbending to occur in resilient means 92. This overbending can either distort the elastic response of the resilient member of can snap the resilient member off from the rotatable wheel.

However, the provision of deflection limiter 112 prevents overbending from occurring. When zoom ring 20 is manually moved by control lever 40, spring legs 102 and 106 are deflected in either a clockwise or counterclockwise direction. When a rotational force is applied to zoom ring 20 that is great enough to deform or snap the spring legs, the spring legs are deflected and engage the side of deflection limiter 112 before they can be overbent or snapped off. The deflection limiter then absorbs the excess rotational energy and provides a non-resilient coupling between the zoom ring and rotatable wheel. Any energy now transmitted to zoom ring 20 will manifest itself in the rotation of rotatable wheel 16 and thus the possibility of overbending the resilient means is avoided.

In the embodiment wherein the deflection limiter is positioned within a groove other than the groove in which the resilient means is positioned, the prevention of overbending of the resilient member is similar to that just described. In this embodiment, the rotation of zoom ring 20 with a force great enough to overbend the resilient means will result in zoom ring 20 rotating until the walls of the second groove engage deflection limiter 112. When zoom ring 20 engages the deflection limiter a non-resilient coupling will be provided and any additional energy transmitted to the zoom ring will result in the rotation of rotatable wheel 16 without any possibility of overbending resilient means 92.

Thus, the invention provides a new and improved power transmission mechanism that permits the smoothing out of the intermittent motion obtained by prior art mechanisms that utilize a reciprocating drive means.

The invention in its broader aspects is not limited to the specific details shown and described but departures may be made from such details within the scope of the disclosure without departing from the principles of the invention and without sacrificing its chief advantages.

WHAT IS CLAIMED IS:

1. In a power transmission mechanism for transmitting power from a rotating power source having a continuous rotary motion to a reversibly rotatable body rotatable in either of two opposite directions, said body having intermittent rotary motion in either direction and including reciprocating drive means mounted adjacent the outer periphery of the body, and operating means driven by the rotating power source and connected to the drive means for imparting reciprocative motion to the drive means to cause the drive means to intermittently engage and rotate the body in one of said two opposite directions, the body having rotational energy during frictional driving engagement of the body by the drive means and the body being stopped during frictional driving disengagement of the reciprocating drive means, the improvement comprising: an output drive member connected to the reversibly rotatable body, and resilient means connecting the body and said output drive member for transmitting the rotational motion of the body in either direction to the output drive member to drive said drive member in a corresponding direction, said resilient means being deflectable in either of two opposite directions from its normal position to permit said resilient means to store a portion of the rotational energy while transmitting the remainder of the rotational energy in the form of rotational movement in said corresponding direction to the output drive member while the body is rotating, and the resiliency of said resilient means being sufficient to revert said resilient means to its normal position to release the stored energy and continue moving the output drive member in said corresponding direction after the body is stopped.

2. The power transmission mechanism of claim 1 wherein said output drive member includes an axial groove and the resilient means comprises a deflectable member that extends axially into the groove and is frictionally engaged within the groove to resiliently couple the output drive member to the reversibly rotatable body.

3. The power transmission mechanism of claim 2 wherein said groove has two spaced parallel axially extending walls and said resilient means includes two axially extending legs which frictionally engage said axially extending walls.

4. The power transmission mechanism of claim 3 including a deflection limiter to limit the deflection of said resilient means and to provide a non-resilient coupling when the deflection is so limited.

5. The power transmission mechanism of claim 4 wherein said deflection limiter extends axially from said reversibly rotatable body and is positioned within said output drive member in an axial groove having axial sides with said deflection limiter being spaced from said axial sides.

6. The power transmission mechanism of claim 5 wherein said deflection limiter extends into the same groove as the resilient means, and said deflection limiter extends between and is spaced from said axially extending legs of the resilient means.

7. The power transmission mechanism of claim 5 wherein the output drive member has a second groove with the deflection limiter being positioned within the second groove.

8. The power transmission mechanism of claim 1 wherein the output drive member is a zoom ring that is connected to a movable lens element of a zoom lens system for moving the lens element axially when the zoom ring is rotated.

* * * * *